April 21, 1925.
C. H. FOLMSBEE
1,534,102
HEATED DISCHARGE OUTLET CASING FOR TANK CARS
Filed April 13, 1922   2 Sheets-Sheet 1
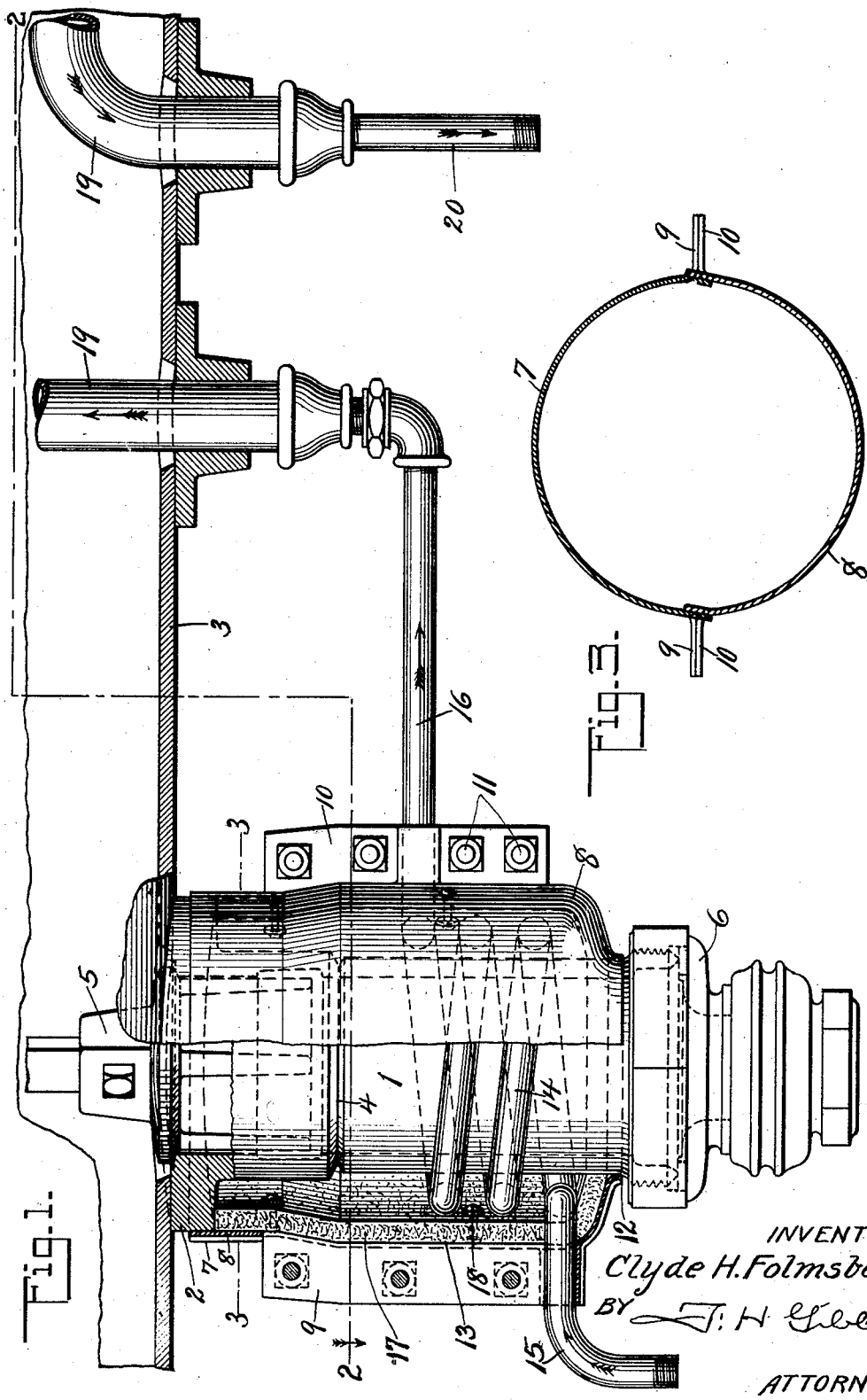
INVENTOR:
Clyde H. Folmsbee
BY  J. H. Gibbs
ATTORNEY.

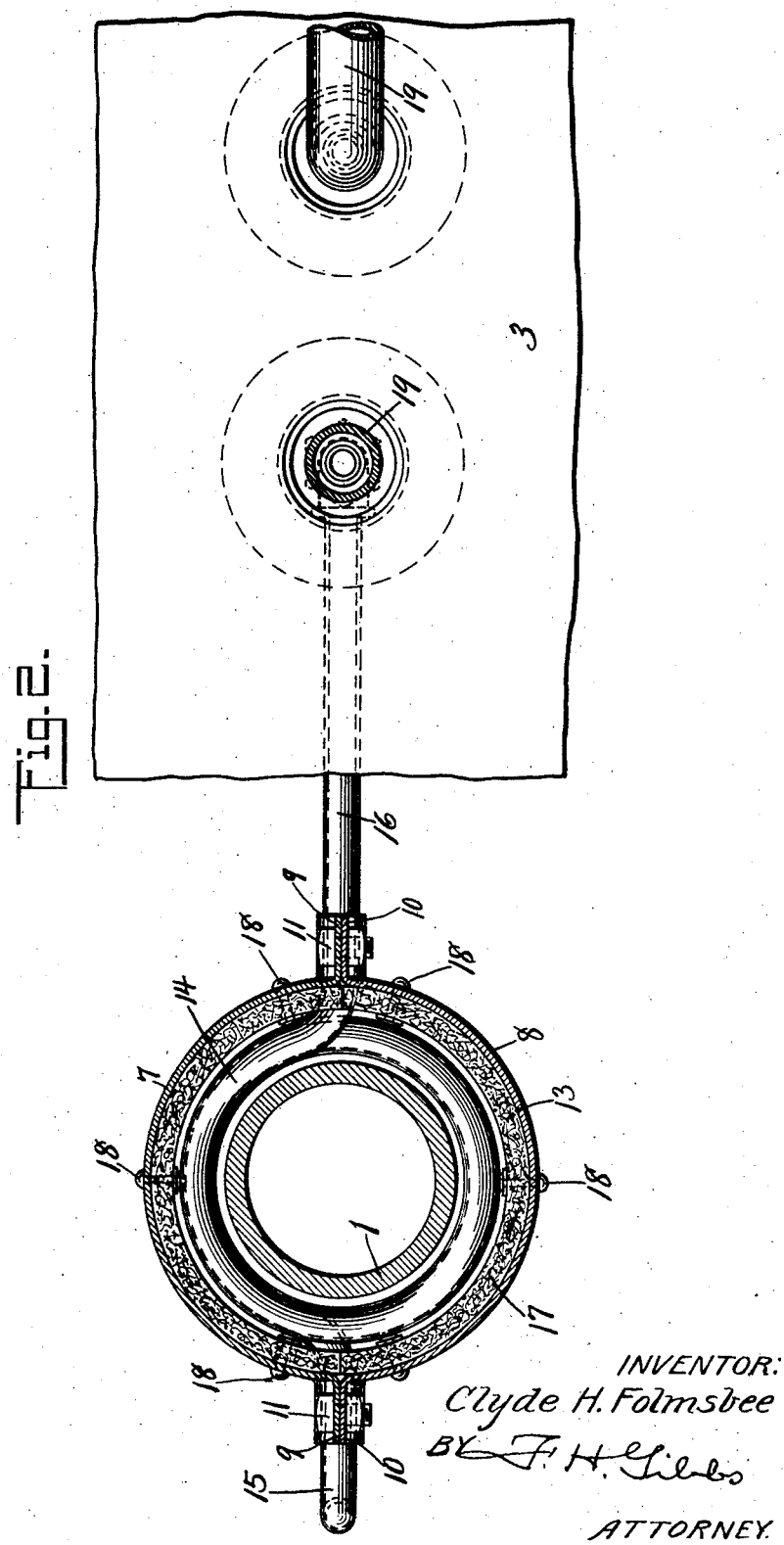

Patented Apr. 21, 1925.

1,534,102

UNITED STATES PATENT OFFICE.

CLYDE H. FOLMSBEE, OF BAYONNE, NEW JERSEY, ASSIGNOR TO AMERICAN CAR AND FOUNDRY COMPANY, OF NEW YORK, N. Y., A CORPORATION OF NEW JERSEY.

HEATED DISCHARGE-OUTLET CASING FOR TANK CARS.

Application filed April 13, 1922. Serial No. 552,426.

*To all whom it may concern:*

Be it known that I, CLYDE H. FOLMSBEE, residing at Bayonne, Hudson County, State of New Jersey, and being a citizen of the United States, have invented certain new and useful Improvements in a Heated Discharge-Outlet Casing for Tank Cars, of which the following is a full, clear, and exact description, such as will enable others skilled in the art to which it appertains to make and to use the same, reference being had to the accompanying drawings which illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a view, partly in section, of my improved steam heated discharge outlet for tank cars showing the connection of the heating coil of the outlet to the heating system of the car tank;

Fig. 2 is a section taken on line 2—2 of Fig. 1; and

Fig. 3 is a section of the protecting casing taken on the line 3—3 of Fig. 1.

It is the object of my invention to provide an improved steam heated discharge outlet and it is also an object of my invention to provide a heating means of such construction that it may be readily applied to the discharge outlets now in use.

With these and other objects in view my invention comprises a discharge outlet casing 1 having a flange 2 secured to the bottom shell 3 of a car tank, as by rivets (not shown). The casing 1 is provided with a breakage groove 4 and has a seat for a discharge outlet valve 5 at one end and threads to receive a threaded outlet cap 6 at the other end.

Surrounding the discharge outlet casing 1 is a protecting casing comprising substantially semi-cylindrical pressed sheet metal sections 7 and 8 having edges which are bent to form outwardly projecting flanges 9 and 10 extending for the greater part of the length of the edges and which abut when the sections 7 and 8 are placed together to form the complete casing. The remaining portions of the meeting edges of the sections 7 and 8 are adapted to over-lap, as shown in Fig. 3, when the flanges 9 and 10 are in engagement.

Bolts 11 engaging in openings in the flanges 9 and 10 serve to secure the casing sections 7 and 8 together and to detachably secure the sections to the discharge outlet casing 1, the sections 7 and 8 having their upper ends in engagement with a face of the flange 2 and their lower ends, which are of less diameter, in engagement with the body of the outlet casing 1, as at 12. When fitted to the outlet casing 1, the sections 7 and 8 form an annular chamber 13 about the casing 1 in which is placed a pipe coil 14 which surrounds the discharge casing 1 and has ends 15 and 16 projecting through openings formed between the engaging flanges 9 and 10 of the casing sections 7 and 8. To prevent excessive loss of heat the protecting casing is provided with a heat insulating lining 17, of asbestos or other suitable material extending from the flange 2 to the point 12 on the body of the casing 1, which is formed in sections similar to the casing sections 7 and 8 and secured to said sections as by bolts or rivets 18.

The end 15 of the pipe coil 14 is adapted to be connected to the steam supply while the end 16 is connected in any desired manner to the steam coil 19 in the tank, the tank coil having the usual outlet 20.

It will be seen therefore, that I have provided a heating means for discharge outlet casings that is of simple and cheap construction, can be readily applied to outlet casings now in use and which can be adapted to various designs of outlet casings without departing from the spirit of my invention.

What I claim is:

1. In a tank car, a discharge outlet casing, a heating coil surrounding said casing and means shielding said heating coil and detachably securing said heating coil to said outlet casing.

2. A tank discharge outlet casing, a heating coil for said casing, means shielding and supporting said heating coil and a heat insulating means carried by said shielding means.

3. A tank discharge outlet casing, a heating coil surrounding said casing, a sectional covering for said coil and a heat insulating lining for said covering.

4. A tank discharge outlet casing, a heating coil surrounding said casing and a sectional heat insulating covering engaging the ends of said coil and securing said coil to said casing.

In witness whereof I have hereunto set my hand in the presence of two witnesses.

CLYDE H. FOLMSBEE.

Witnesses:
ELLEN G. WEBSTER,
R. W. SMITH.